United States Patent
Sanchez

(10) Patent No.: US 7,151,346 B2
(45) Date of Patent: *Dec. 19, 2006

(54) METHOD AND APPARATUS FOR OPTIMIZING POWER EFFICIENCY IN LIGHT EMITTING DEVICE ARRAYS

(75) Inventor: Jorge Sanchez, Poway, CA (US)

(73) Assignee: CEYX Technologies, Inc., San Diego, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 10/984,614

(22) Filed: Nov. 8, 2004

(65) Prior Publication Data

US 2005/0116662 A1 Jun. 2, 2005

Related U.S. Application Data

(60) Provisional application No. 60/518,592, filed on Nov. 6, 2003.

(51) Int. Cl.
G05F 1/00 (2006.01)

(52) U.S. Cl. .................. 315/308; 315/224; 315/291

(58) Field of Classification Search .............. 315/312, 315/314, 316, 318, 247, 308, 102, 207, 291, 315/225, 224, 324; 345/102, 207
See application file for complete search history.

(56) References Cited

U.S. PATENT DOCUMENTS

| | | | | |
|---|---|---|---|---|
| 5,838,290 A | * | 11/1998 | Kuijk | ......................... 345/91 |
| 6,344,641 B1 | | 2/2002 | Blalock et al. | .............. 250/205 |
| 6,496,236 B1 | * | 12/2002 | Cole et al. | .................... 349/61 |
| 6,654,268 B1 | * | 11/2003 | Choi | ......................... 363/134 |
| 6,717,374 B1 | * | 4/2004 | Krummel | .................... 315/291 |
| 6,812,916 B1 | * | 11/2004 | Hwang | ........................ 345/102 |
| 6,922,023 B1 | | 7/2005 | Hsu et al. | .................... 315/291 |

(Continued)

FOREIGN PATENT DOCUMENTS

EP 1 077 444 A 2/2001

(Continued)

OTHER PUBLICATIONS

White Paper for CEYX Technologies LCD Backlighting Control 'Online!, Published Mar. 30, 2006, pp. 1-5 XP002322704 Retrieved from the Internet: URL:http://www.ceyx.com/web/WhitepaperLCDBacklightingControl.pdf>' retrieved on Mar. 30, 2005!.

(Continued)

*Primary Examiner*—Hoanganh Le
*Assistant Examiner*—Tung Le
(74) *Attorney, Agent, or Firm*—Charles F. Reidelbach, Jr.

(57) ABSTRACT

The disclosed embodiments provide a method and apparatus for optimizing power efficiency in liquid crystal displays. A microprocessor or embedded microcontroller associated with circuit control modules eliminates redundancy by allowing a single inverter to equalize the intensity of illumination for an array of multiple CCFLs. The microcontroller optimizes power management by continuously sensing the operating currents of every lamp and automatically adjusts for variations in illumination of individual lamps by parallel switching of capacitance that ensures an equal current is applied to each lamp. The microcontroller produces the appropriate control signals and executes a digital servo control algorithm to modify the currents for carrying out the luminance adjustments.

26 Claims, 8 Drawing Sheets

U.S. PATENT DOCUMENTS

| | | | |
|---|---|---|---|
| 2002/0097004 A1 | 7/2002 | Chiang et al | 315/224 |
| 2003/0142060 A1* | 7/2003 | Lee et al. | 345/102 |
| 2003/0201967 A1* | 10/2003 | Yu | 345/102 |
| 2003/0227435 A1* | 12/2003 | Hsieh | 345/102 |
| 2003/0234762 A1* | 12/2003 | Nakatsuka et al. | 345/102 |
| 2004/0046512 A1* | 3/2004 | Suzuki et al. | 315/291 |
| 2004/0068511 A1 | 4/2004 | Sanchez | 707/100 |
| 2004/0207340 A1 | 10/2004 | Huang | 315/291 |
| 2005/0078081 A1* | 4/2005 | Oda et al. | 345/102 |
| 2005/0093484 A1* | 5/2005 | Ball | 315/291 |

FOREIGN PATENT DOCUMENTS

| | | |
|---|---|---|
| WO | WO 2004/026006 A2 | 8/2003 |
| WO | WO 2004/072733 A2 | 2/2004 |

OTHER PUBLICATIONS

International Search Authority for PCT/US2004/037504, date of mailing Jul. 18, 2005 and written opinion.

* cited by examiner

METHOD AND APPARATUS FOR OPTIMIZING POWER EFFICIENCY IN LIGHT EMITTING DEVICE ARRAYS

CROSS-REFERENCE TO RELATED APPLICATION

This application is a utility conversion of U.S. Provisional Application No. 60/518,592, filed Nov. 6, 2003, which is a continuation in part of co-pending PCT Application No. PCT/US2004/003400, having an international filing date of Feb. 6, 2004, which is a conversion of U.S. Provisional Application No. 60/445,914 with a filing date of Feb. 6, 2003.

BACKGROUND

1. Field

The presently disclosed embodiments relate generally to the efficient power management and control of arrays of light emitting devices such as Cold Cathode Fluorescent Lamps and Light Emitting Diodes. More specifically, the disclosed embodiments relate to improving the power efficiency in the backlighting of Liquid Crystal Displays.

2. Background

Arrays of Cold Cathode Fluorescent Lamps (CCFLs) are now commonly used for backlighting Liquid Crystal Displays (LCDs) in notebook and laptop computer monitors, car navigation displays, point of sale terminals and medical equipment. CCFLs have quickly been adopted for use as the backlight in notebook computers, and various portable electronic devices because it provides superior illumination and cost efficiency. Many of these applications allow only a very limited supply of power, and thus, the power consumption must be judiciously managed. Current methods of managing power in LCDs are inefficient. As display panels increase in size, it is necessary for more power efficient designs and methods to be deployed.

Typically, a high voltage DC/AC inverter is required to drive the CCFL because the lamp uses a high Alternating Current (AC) operating voltage. With the increasing size of the LCD panel, multiple lamps or arrays are required to provide the necessary illumination. Therefore, an effective inverter is required to drive the CCFL arrays.

Intensity of illumination is determined primarily by the operating current applied to each CCFL by a converter. In conventional lamp panel arrays, each lamp is driven by its own inverter which is typically 70% efficient in delivering power to the lamp. This efficiency, or lack thereof, coupled with the redundant inverter circuitry necessary for powering a multiple lamp array results in a significant amount of power consumption.

It would be desirable to conserve power by using a single inverter to power an entire lamp panel array. However, using a shared inverter forces the operating current of all the lamps to the same current as determined by a reference lamp. Since each lamp has characteristics that cause it to vary in brightness and intensity due to age, replacement and inherent manufacturing variations, applying the same reference voltage to each lamp, without adjusting for individual lamp variations, results in a different intensity of illumination between lamps in the array. Such varying illumination intensities cause undesirable lines to be visible in the LCD display. The prior art attempts to solve this problem by adding a thicker diffuser panel between the lamps and the LCD display to smooth out diffuse lighting differences. This in turn results in more power consumption by the lamps in order to obtain the optimum light intensity at the surface of the display. Thus, reducing the number of inverters and redundant circuitry to conserve power requires a new design and method which effectively removes variations which cause unacceptable varying lamp intensities while minimizing total power consumption.

CCFL component variations can be broken down into two classifications, "fixed" and "dynamic." Fixed variations are defined as inherent manufacturing variations between lamps and their inverter circuit components, such as the transformer and primary drive circuit. Conventional lamp designs utilizing a single or small number of CCFLs attempt to minimize fixed variations by manually adjusting a potentiometer in each lamp circuit. This method is impractical in larger multiple lamp arrays commonly found today. Instead, these fixed variations in components are minimized by forcing the inverter circuit to supply more power than is necessary in order to compensate for a more demanding lamp in the array, or for a "weaker" transformer or primary drive circuit. This "overcompensating" to account for variations is another inefficient use of power since the extra power may not be required at all or to the degree compensated. Accordingly, there is a need for a panel display design and method which automatically establishes an optimal lamp power for each lamp in the array despite fixed variations in components in singular inverter applications.

Dynamic variations are variations in lamp luminance over use, time and temperature, as well as variations in DC supply voltage (battery) to the inverter circuit. The prior art solution described above is not applicable since a potentiometer set point is adjusted only at manufacture and remains fixed over time. Again, conventional designs attempt to get around this problem by using an initial current setting that is higher in value than what is actually required for optimal lamp luminance. This results in the inefficient use of power. Accordingly, there is a need for an inverter circuit design which automatically establishes and delivers an optimal power to each lamp in light of changing component variations such as aging, temperature, and battery or other DC supply voltage, rather than relying on overcompensation of power to ensure each lamp is properly driven.

A known method of adjusting lamp luminance is incorporating dimming capability into the circuit design. Dimming is typically accomplished through either current limiting or PWM. In the current limiting mode, the lamp current is reduced, but the lamp stays on all the time. In the PWM mode, the lamp is turned full on and off at a repetition rate of about 100 to 400 Hz with a dimming range being determined by the duty cycle (fraction on time). For example, if a lamp is dimmed to 75% luminance, a PWM waveform with a duty cycle of 75% is used. Each time the lamps are turned on, there is a need to re-apply a "strike voltage." The strike voltage corresponds to twice the operating voltage and is applied until the lamp switches to its fluorescent state, whereupon the voltage can be reduced to a "sustaining voltage." Conventional analog controllers detect when a strike has occurred by utilizing a current control loop having a frequency response of about a few hundred (200) Hz. This slow response time delays the reduction in lamp voltage from the strike value to the sustaining value resulting in inefficient use of power. Accordingly, there is a need for a panel display design and method which utilizes a current control loop which has a faster response time (such as 20M Hz) for detecting fluorescence and reducing lamp voltage to a sustaining voltage.

Another inefficient use of power in large displays with multiple lamps driven by a single inverter is the power switching control circuit which sets total lamp currents. In conventional applications where a single inverter is used to drive a lamp array, power to the lamp is switched with a Pulse Width Modulator (PWM). The primary circuit of the inverter contains Mosfets which control power to the transformer. The time it takes to switch the Mosfets between their on and off states results in high circuit resistance which in turn consumes significant amounts of power. In conventional analog controller circuits, the timing of the primary circuit can only be improved by changing out the associated passive components surrounding the analog controller. Accordingly, it is desired that the timing of the primary circuit be more easily adapted to manufacturing variations and changing conditions through automatic calibration of the timing of pulses used to drive the Mosfets, thereby minimizing power consumption.

As the market place has driven down the cost of CCFLs, resulting in widespread use of multiple lamp array panels, the demand for power efficiency has increased. Conventional types of backlights for LCD devices are not fully satisfactory with respect to the amount of power they consume. Thus, there is a need in the art for a display panel design and method capable of individually sensing and adjusting the current applied to an array of CCFLs in multiple lamp LCD displays while also reducing the amount of power consumption.

SUMMARY

Embodiments disclosed herein address the above-stated needs by providing a method and apparatus for optimizing the power efficiency in light emitting device arrays. This is accomplished with a control module having a single CCFL converter capable of preserving individual current settings in a multiple lamp array.

The control module uses a switching circuit comprising a rectifier bridge, a transistor switch and a microcontroller interface serially coupled to a CCFL circuit. Alternatively a switched capacitor circuit is serially coupled to a CCFL circuit. A microprocessor executes servo control system software for sensing current and illumination intensity feedback information used to drive a current control circuit. The system software monitors the current and voltage across the lamps and determines the capacitance required to obtain a specific amount of current in each lamp. A control module comprising a single inverter drives a multiple lamp array while retaining precise control of current, and hence intensity of illumination and optimal power efficiency, in each lamp.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, and wherein.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

The disclosed embodiments provide a method and apparatus for optimizing the power efficiency of liquid crystal displays. A microprocessor or embedded microcontroller associated with visual enhancement circuit modules allows a single inverter to equalize the intensity of illumination for an array of multiple CCFLs. The microcontroller continuously senses the operating currents of every lamp and adjusts for variations in illumination of individual lamps by parallel switching of capacitance that ensures an equal current is applied to each lamp. The microcontroller produces the appropriate control signals and executes a digital servo control algorithm to modify the currents for carrying out the luminance adjustments.

Figure 1:
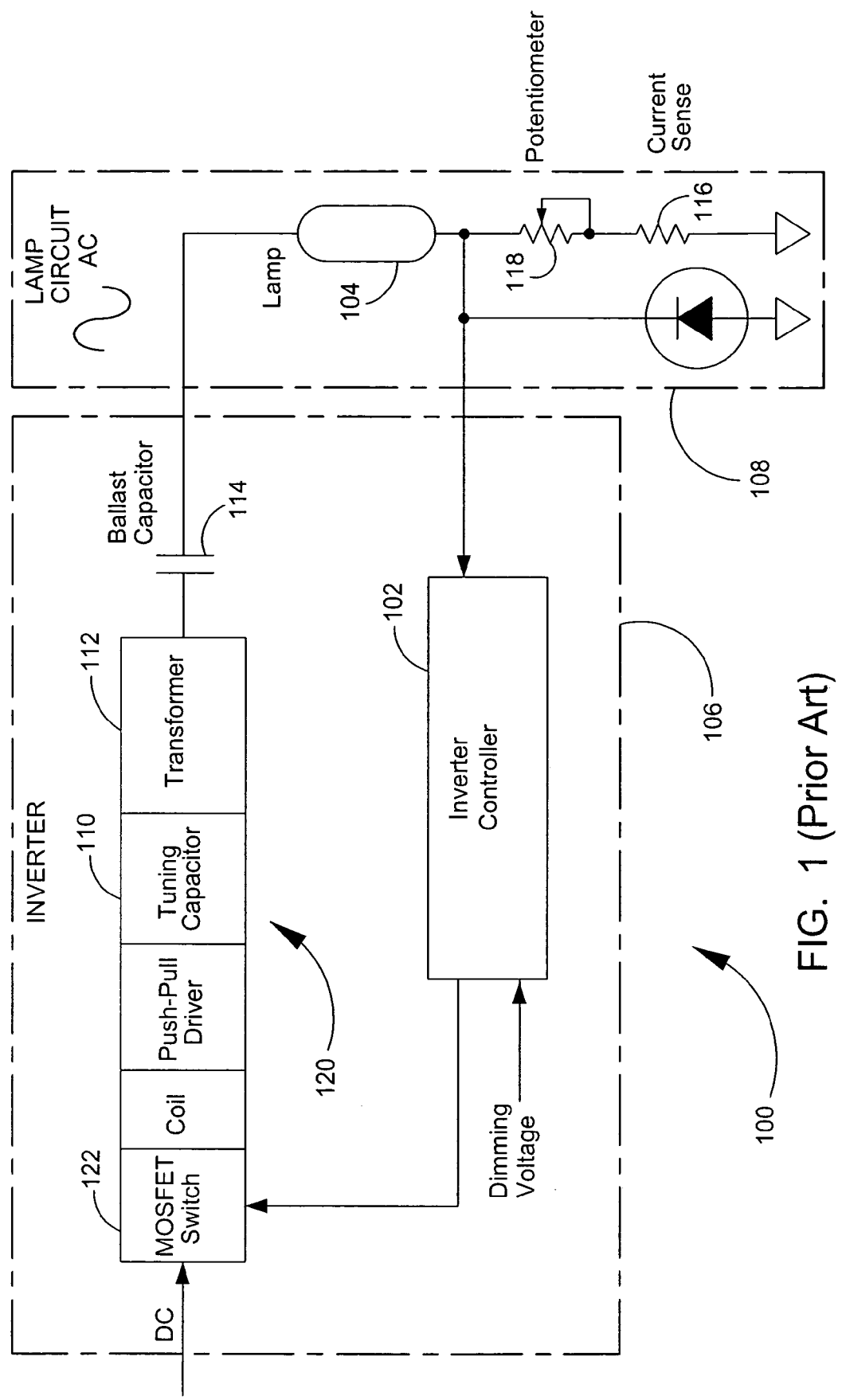
FIG. 1 shows a conventional inverter circuit for driving a single CCFL.

FIG. 1 illustrates a conventional CCFL control circuit 100 requiring an inverter 120 for each lamp 104 in an LCD backlight array. CCFL lamps 104 exhibit significant manufacturing variations. CCFL component variations can be broken down into two classifications, "fixed" and "dynamic." Fixed variations are defined as inherent manufacturing variations between lamps 104 and their inverter circuit components 100, such as the transformer 112 and primary drive circuit. Dynamic variations are variations in lamp luminance over use, time and temperature, as well as variations in DC supply voltage (battery) to the inverter control circuit 100.

Lamps 104 are driven from an inverter control circuit 100, which contains a primary side circuit 106, and a secondary side circuit 108. The primary side circuit 106 manages high currents and low voltages and connects to the primary side of a transformer 112. The secondary side circuit 108 contains the secondary of the transformer 112, a ballast capacitor 114, the fluorescent lamp 104, a current sensor 116 and a potentiometer 118 to adjust the lamp current.

If more than one lamp is driven out of the same inverter 120, due to the lamp variations, the current through each lamp will be different. As a result, the luminance across an LCD panel will be uneven. The portion of the inverter 120 that is directly connected to the lamp (secondary voltage of the transformer 112) is a high voltage circuit. Because of the magnitude of the voltages involved, the circuit 100 cannot be easily controlled in order to change the power applied to the lamp 104.

Conventional solutions resolve the problem by utilizing a separate inverter 120 for each lamp 104. Using a separate inverter 120 for each lamp 104 allows the adjustment of the current in the individual lamp with a potentiometer 118. The current sense signal is used to operate a switching circuit 122 in the inverter 120, which operates with low voltage (primary of transformer 112). The conventional solution is very costly because numerous inverters 120 are used for a given LCD display.

Figure 3:
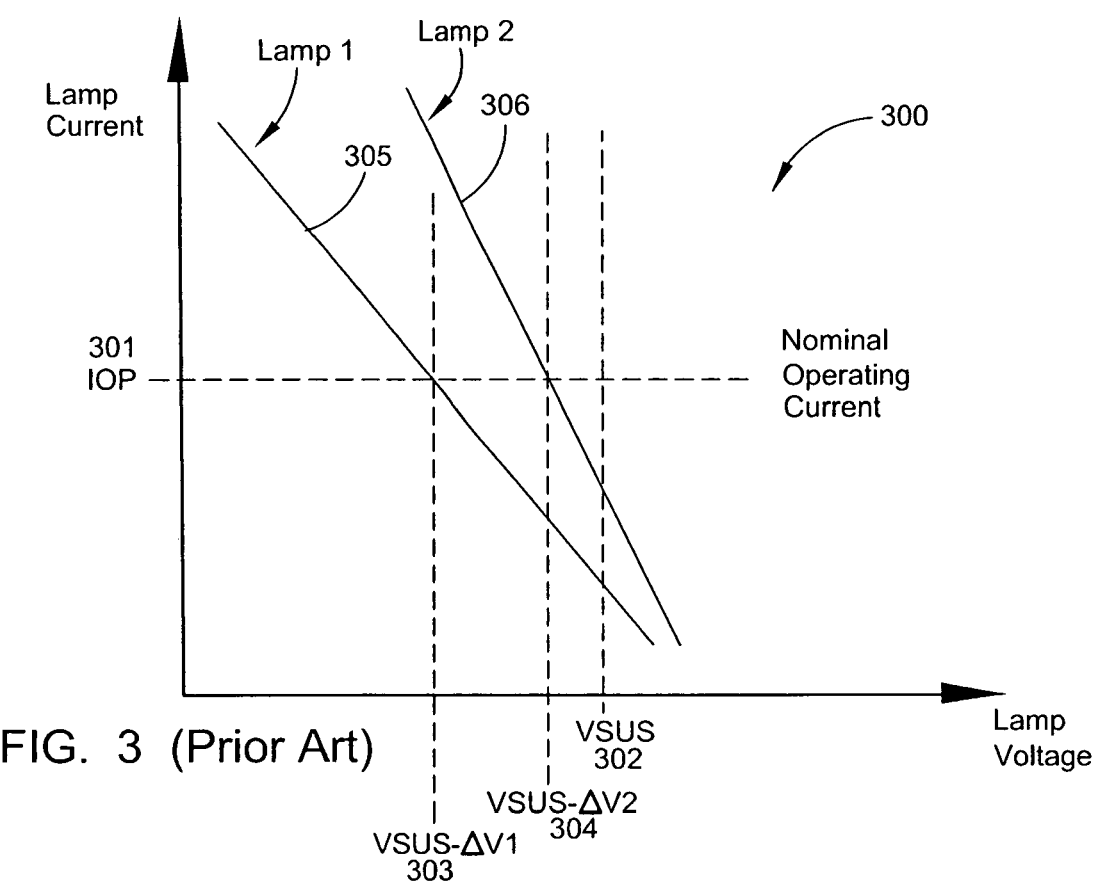
FIG. 3 illustrates conventional variations in characteristic current with respect to voltage for multiple CCFLs driven by a conventional shared inverter.

FIG. 3 shows conventional variations in characteristic current with respect to voltage when two CCFLs are driven from the same inverter. Each slope (305, 306) is different after its strike voltage has been attained. If a target lamp current equals a Nominal Operating Current of IOP 301, and the Nominal Sustaining Voltage equals VSUS 302, the voltage applied to lamp 1 must be reduced by a delta of V1 to obtain a voltage across lamp 1 of VSUS minus the delta of V1 303. Likewise, the voltage applied to Lamp 2 voltage must be reduced by a delta of V2 to obtain a voltage across lamp 2 of VSUS minus the delta of V2 304. The voltage reductions across the lamps will result in the same Nominal Operating Current of IOP for both lamps, which will produce a uniform intensity of illumination.

FIG. 3 shows conventional variations in characteristic current with respect to voltage when two CCFLs are driven from the same inverter. Each slope (305, 306) is different after its strike voltage has been attained. If the target lamp current equals a Nominal Operating Current of IOP 301, and the Nominal Sustaining Voltage equals VSUS 302, the voltage applied to lamp 1 must be reduced by a delta of V1 to obtain a voltage across lamp 1 of VSUS minus the delta of V1 303. Likewise, the voltage applied to Lamp 2 voltage must be reduced by a delta of V2 to obtain a voltage across lamp 2 of VSUS minus the delta of V2 304. The voltage reductions across the lamps will result in the same Nominal Operating Current of IOP for both lamps, which will produce a uniform intensity of illumination.

Figure 4:
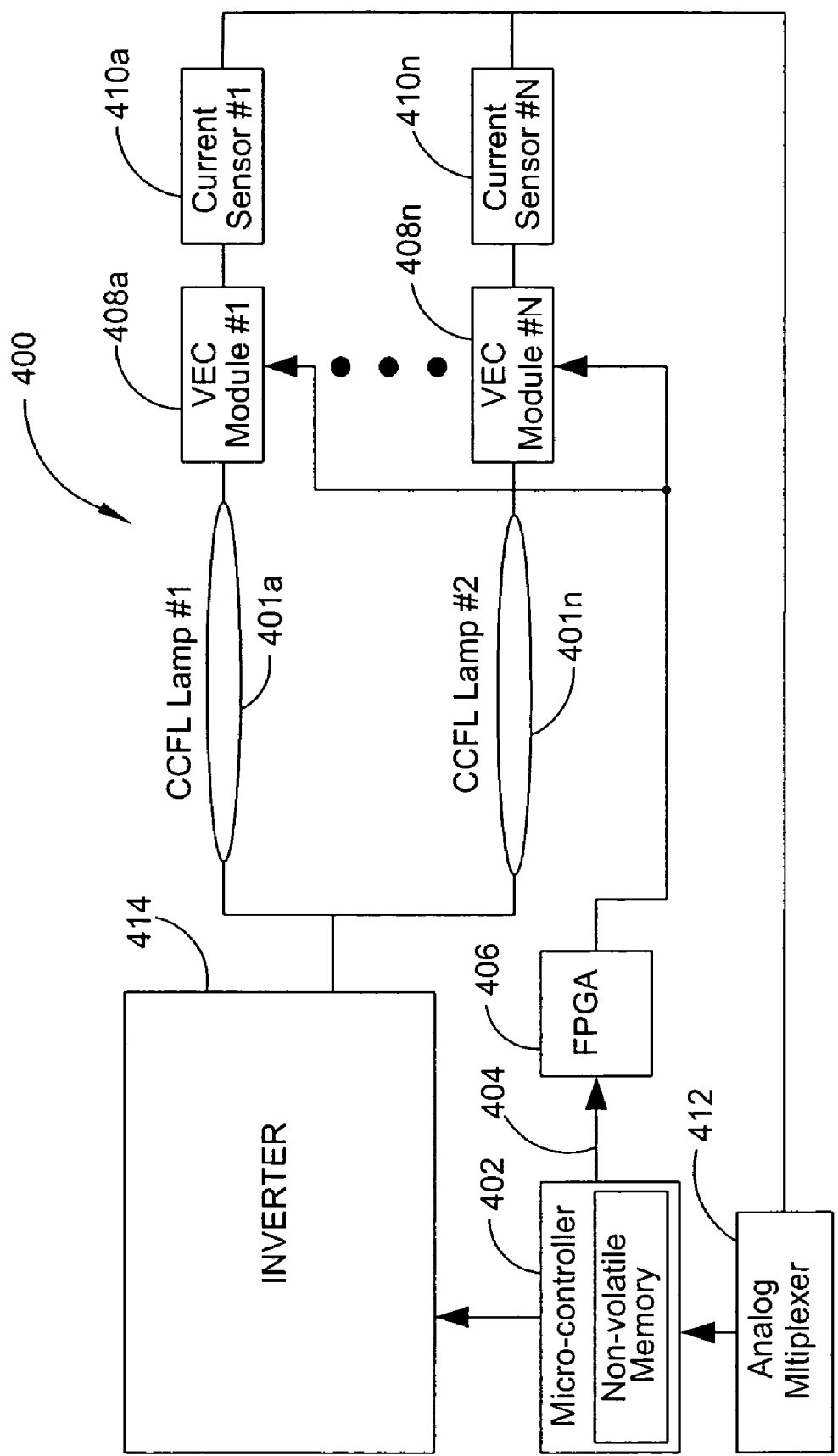
FIG. 4 illustrates a closed loop control system for multiple CCFLs in accordance with one embodiment of the present invention.

FIG. 4 is a block diagram illustrating a closed loop control system 400 for backlighting an array of N CCFLs 401 in accordance with one embodiment of the present invention.

A microcontroller 402 executes, from non-volatile memory, one or more software modules comprising program instructions that generate current control signals for input to a Field Programmable Gate Array (FPGA) 406. A software module may reside in the microcontroller, RAM memory, flash memory, ROM memory, EPROM memory, EEPROM memory, registers, hard disk, a removable disk, a CD-ROM, or any other form of storage medium known in the art.

The FPGA 406 distributes the current control signals 404 to visual enhancement control modules (VECM) 408 associated with individual CCFLs 401 as specified by the microcontroller 402. The VECM 408 (detailed in FIG. 6 and FIG. 7) drive each CCFL 401 with the amount of current specified by the microcontroller 402. Current sensors 410 continuously detect the actual individual lamp currents for feedback to the microcontroller 402. The individual lamp currents output by the current sensors 410 are multiplexed by analog multiplexer 412 for input to the microcontroller 402.

A servo control algorithm software module executed by the microcontroller 402 continuously utilizes the multiplexed feedback information provided by the current sensors 410 to adjust visual enhancement control module 408 settings. These setting adjustments maintain desired individual lamp currents by continuously compensating for current variations caused by age, replacement, inherent manufacturing variations and changes in temperature. Software modules executed by the microcontroller 402 concurrently control and adjust the operation of an inverter 414 that controls the secondary voltage output of the inverter 414 (See FIG. 1, element 112). The secondary voltage output of the inverter 414 is applied to the CCFLs 401.

In various embodiments, any combination of microcontrollers 402, inverters 414, memory, FPGAs 406, multiplexers 412, current sensors 410 and control modules 408 may be integrated on a Printed Circuit (PC) board or in an Application Specific Integrated Circuit (ASIC). Alternately, the microcontroller 402, FPGA 406 and Multiplexer 412 may be integrated with the inverter assembly 414. The microcontroller 402, FPGA 406 functionality and the multiplexer 412 may also be integrated in the same, or another, single IC. Additionally, one or more visual enhancement control modules 408 may be integrated in a single IC, which may also comprise current sensors 410 or light sensors (See FIG. 5, element 510).

A Graphical User Interface supported by one or more software modules executed by the microcontroller 402 may be used to perform initial current settings or optionally, to later override servo control algorithm maintenance settings.

Figure 5:
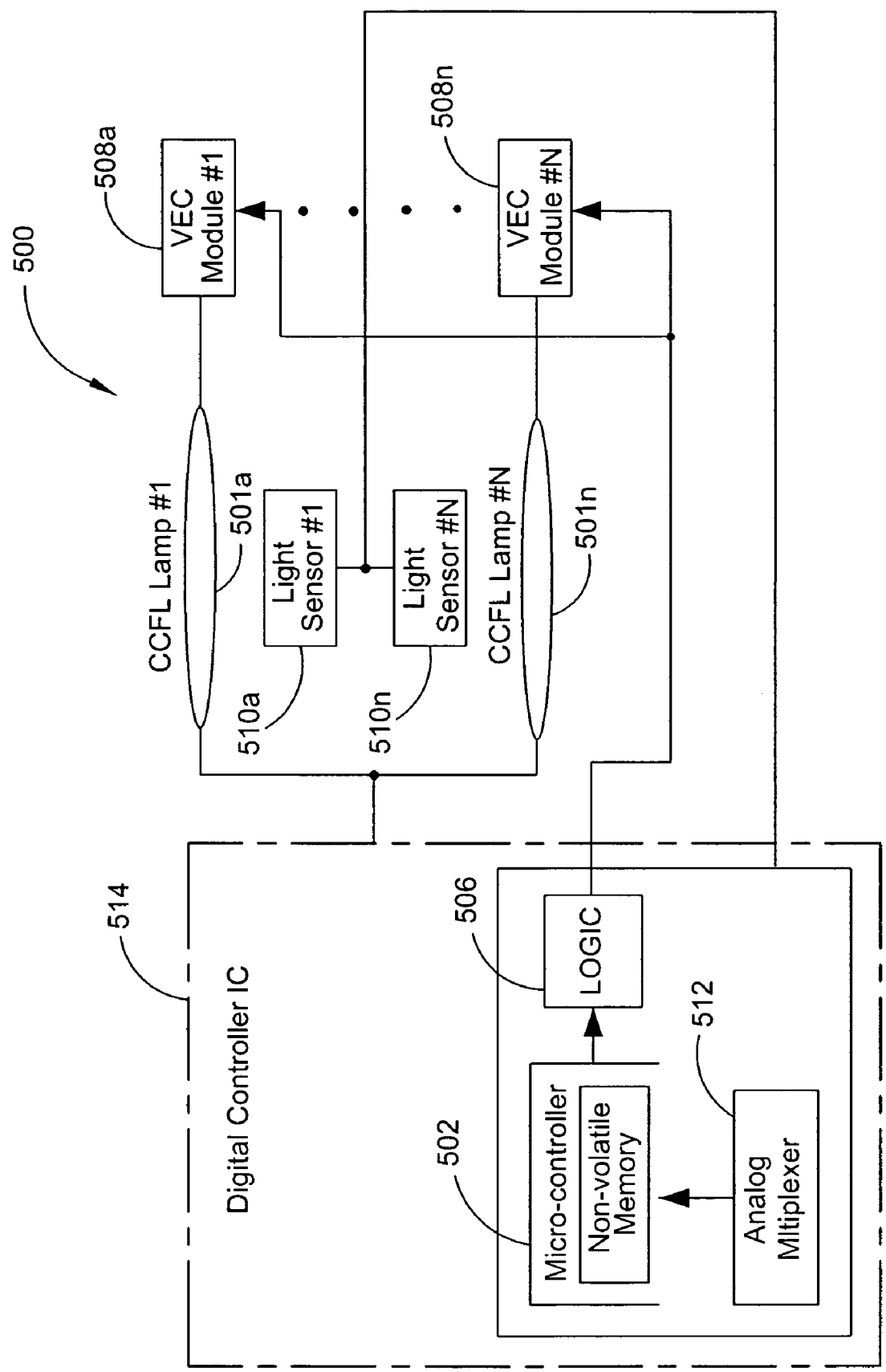
FIG. 5 illustrates a control system for multiple CCFLs in accordance with another embodiment of the present invention.

FIG. 5 illustrates a visual enhancement control system for multiple CCFLs in accordance with another embodiment of the present invention. The alternative visual enhancement control system 500 embodied in FIG. 5 utilizes one or more light sensors 510 rather than current sensors (See FIG. 4, element 410) to provide feedback information to the microcontroller 502. A servo control algorithm software module executed by the microcontroller 502 continuously utilizes the multiplexed feedback information provided by the light sensors 510 to adjust the control module settings. These setting adjustments maintain desired individual levels of luminance by continuously compensating for variations caused by age, replacement, inherent manufacturing variations and changes in temperature.

As detailed in FIG. 5, visual enhancement control modules 508 set the current in the CCFLs 501. The amount of current applied to each CCFL 501 through its associated visual enhancement control module 508 is determined by control signals from logic block 506. Logic block 506 performs the equivalent functionality of a FPGA (See FIG. 4, element 406) The logic block 506, the microcontroller 502 and the analog multiplexer 512 may be components of a single integrated digital controller circuit.

Feedback to the closed loop control system 500 is provided by one or more light sensors 510. The light sensors 510 detect the amount of light output by the CCFLs 510. The light sensors 510 produce light output feedback signals for input to an analog multiplexer 512. The analog multiplexer 512 routes the light sensor feedback signals to an analog to a digital (A/D) converter, which may be embedded in the microcontroller 502. A closed loop servo control algorithm software module executed by the microcontroller 502 continuously maintains a predetermined luminance set point for each CCFL 501. As CCFLs 501 age, output precision is advantageously improved by determining luminance output levels with light sensors 510.

In addition to preserving individual current settings in multiple lamp arrays for uniformity of luminosity, the above disclosed embodiments of a control system may also operate to produce visual effects in backlit luminent devices. The control system may be used to increase or decrease luminosity in selected portions of a display. For example, three dimensional effects can be created for video material comprising an explosion by increasing the light output level of portions of the display where the explosion occurs. Similarly, visual effects can be created for material enhanced by shadows such as scenes of a dark alleyway. Visual effects can be created by the disclosed control system using software modules that vary the amount of light output from a backlighting device in specific areas of a display.

Figure 6:
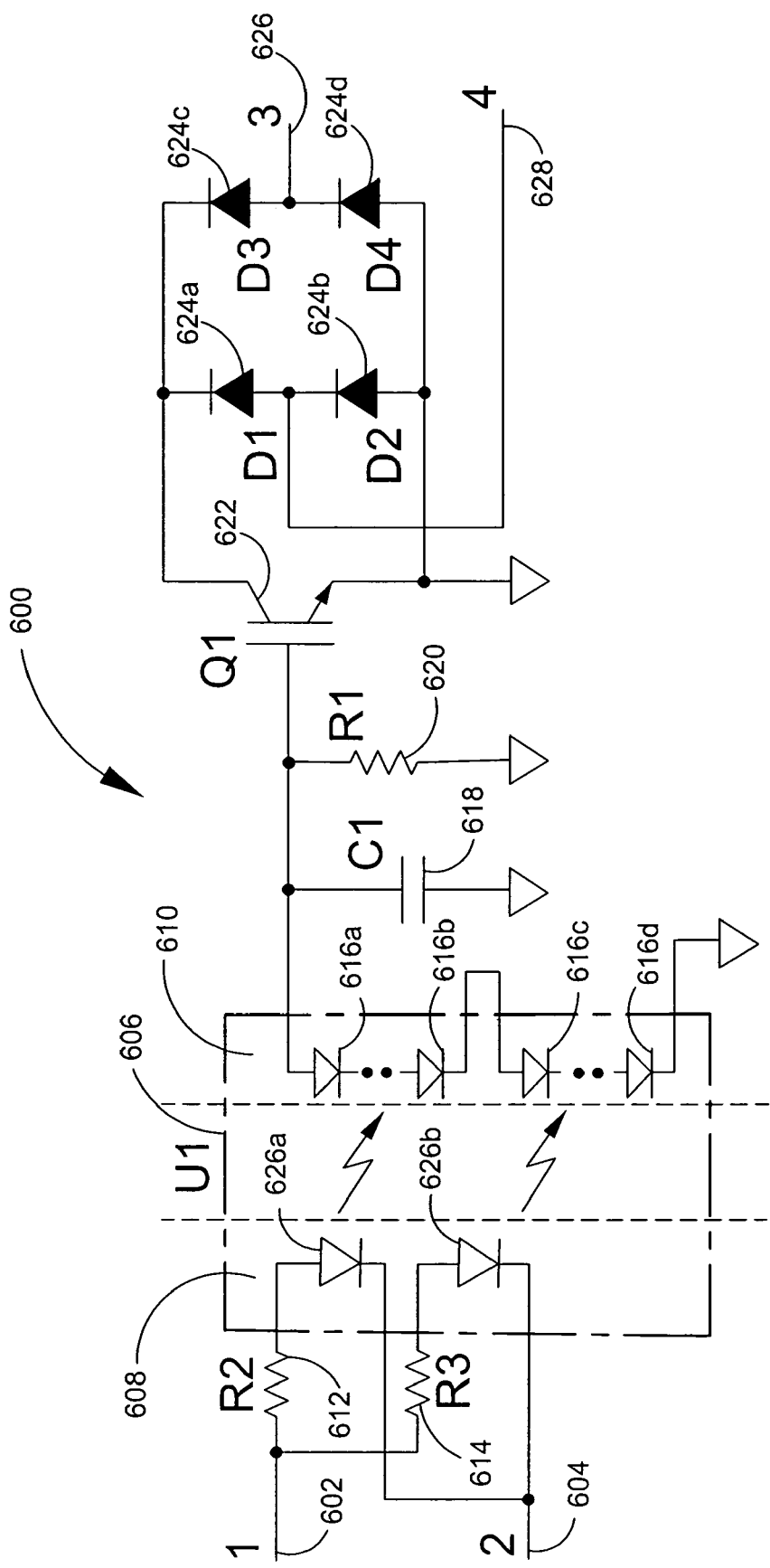
FIG. 6 shows a control module in accordance with one embodiment of the present invention.

FIG. 6 details the control modules illustrated in the system block diagrams of FIG. 4 and FIG. 5 in accordance with one embodiment of the present invention. The control module 600 adjusts the current applied to an individual CCFL according to control signals externally generated by a microcontroller (not shown). Inputs 602 and 604 receive a current control signal routed from a microcontroller by a system controller FPGA or Logic Block (not shown). The control signal may comprise a Direct Current (DC) voltage, or a Pulse Width Modulated (PWM) signal. The value of the control signal determines the amount of current through each CCFL in a multiple lamp array.

The control signals are applied to U1 606 an optical or photovoltaic device for converting the control signal to an isolated control voltage. Resistors R2 612 and R3 614 set a specified current in U1 606 proportional to the applied control signal. An optical isolator transfers the control signal to a secondary side of U1 610.

Where U1 is a photovoltaic inverter, light produced by output LEDs 626 in U1 will be converted to a voltage by the secondary side of U1 610. Capacitor C1 618 filters the output of U1 to produce an isolated control signal compatible with transistor Q1 622. Resistor R1 620 sets the impedance at the base of Q1 622 to a value that enables stable operation of Q1 622. Transistor Q1 622 may operate in a switch mode or in a linear mode as required by the CCFL current response. A current control bridge comprised of diodes D1–D4 624 routes both polarities of Alternating Current (AC) through Q1 622 to drive the CCFL.

In this manner, the received current control signal is converted to a proportional light output that is converted to a voltage, which generates a current specified by the control signal. The current specified by the control is output to a CCFL.

Figure 7:
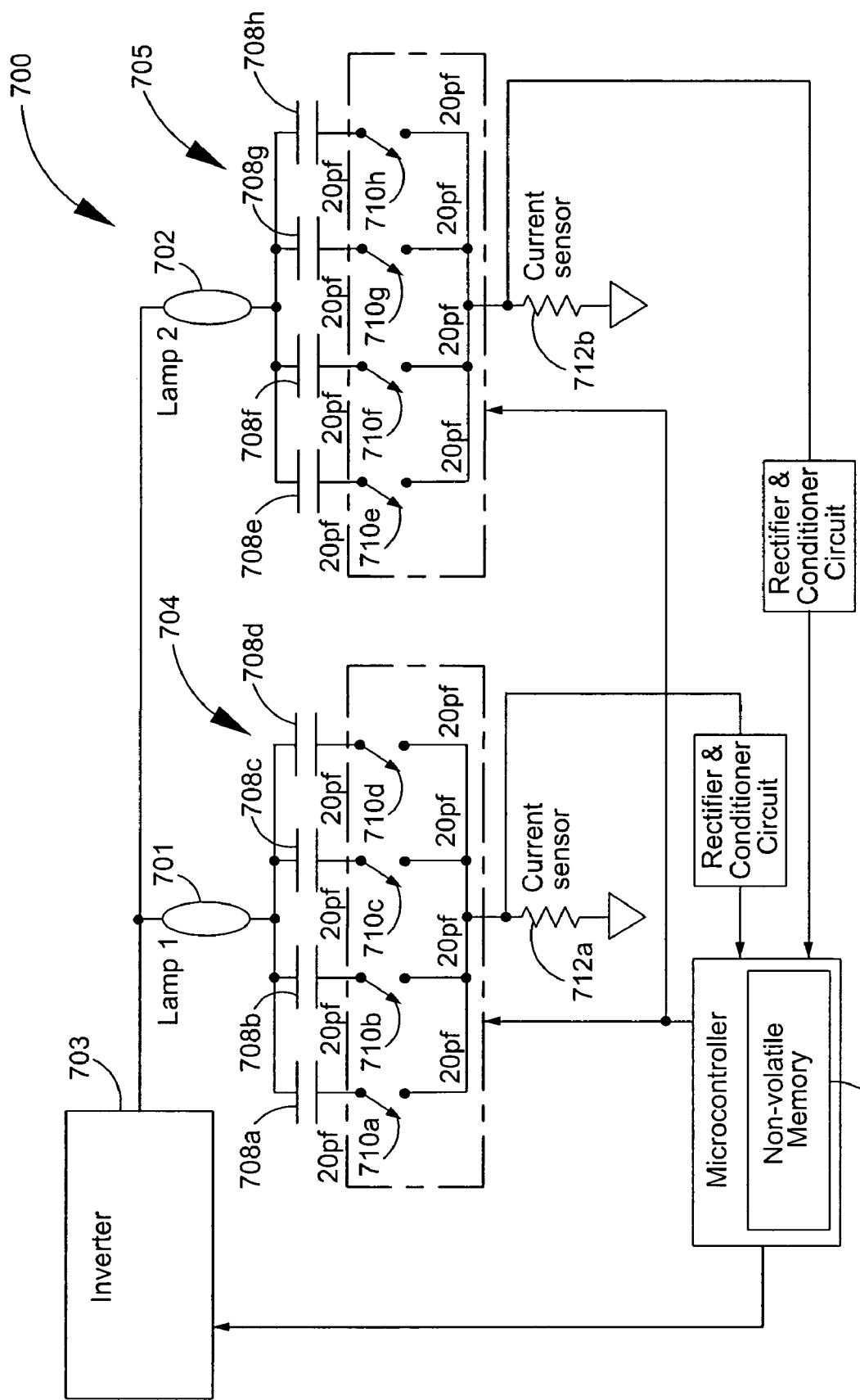
FIG. 7 shows a control module in accordance with another embodiment of the present invention.

FIG. 7 details the visual enhancement control modules illustrated in the system block diagrams of FIG. 4 and FIG. 5 in accordance with another embodiment of the present invention. In the alternative visual enhancement control module 700 embodied in FIG. 7, two or more CCFLs (701, 702) are again driven by a single inverter 703. For simplicity, two exemplary CCFLs are shown. The visual enhancement control module 700 comprises a current control circuit 704 for CCFL 1 701 and a current control circuit 705 for CCFL 2 702. The control circuits (704, 705) are comprised of a plurality of parallel capacitors 708 coupled by switches 710. A microprocessor 706 controls inverter 703. Other values of capacitors 708 may be used to vary the current control effect.

Design difficulties are created by very small values of capacitance required by CCFLs. The controller of the present invention (704, 705) overcomes these capacitance design difficulties by providing a microcontroller 706 for execution of a calibration algorithm stored in non-volatile memory. The microcontroller executes a calibration procedure, which measures the current through each CCFL (701, 702) with current sensors 712 and an A/D inverter that may be internal to the microcontroller 706. The microcontroller 706 then closes the appropriate switches 710 in order to obtain the correct combination of capacitors that increases or reduces the lamp voltage by an appropriate amount.

Additional design difficulties are presented by the high voltages required by CCFLs. Theses difficulties are likewise overcome by the current control circuit of the present invention (704, 705) because the control circuits (704, 705) only require a voltage nominal enough to modify a CGFL (701, 702) operating point.

Figure 2:
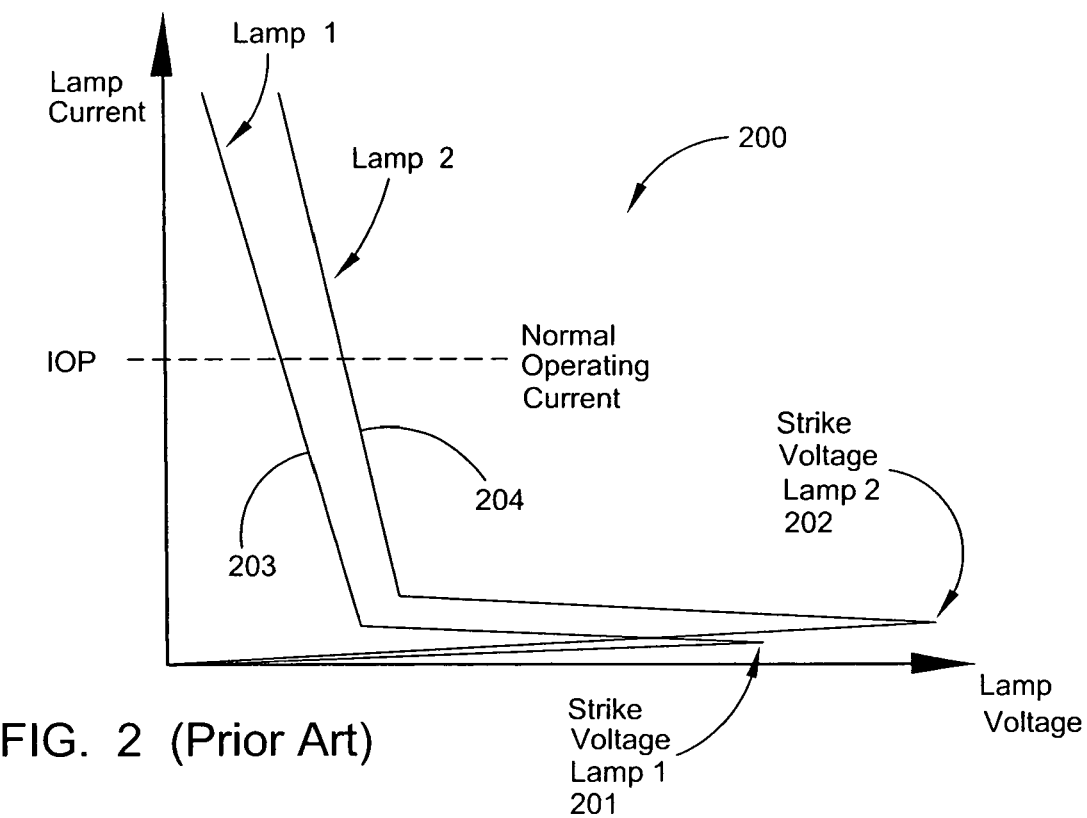
FIG. 2 illustrates conventional variations in characteristic current with respect to voltage for multiple CCFLs driven by conventional individual inverters.

Because the slopes of the lamp characteristics after strike are very steep, the voltage across the equalizer must only be a few hundred volts. (See FIG. 2 and FIG. 3.) The voltages are easily handled with readily available capacitor and switch technology (see for example Supertex Inc. for high voltage switches, part number HV20220). The microcontroller may also use PWM for the controls that open and close the switches 710. The PWM duty cycle determines the exact value of capacitance. This approach allows for additional fine-tuning of the capacitor values.

Figure 8:
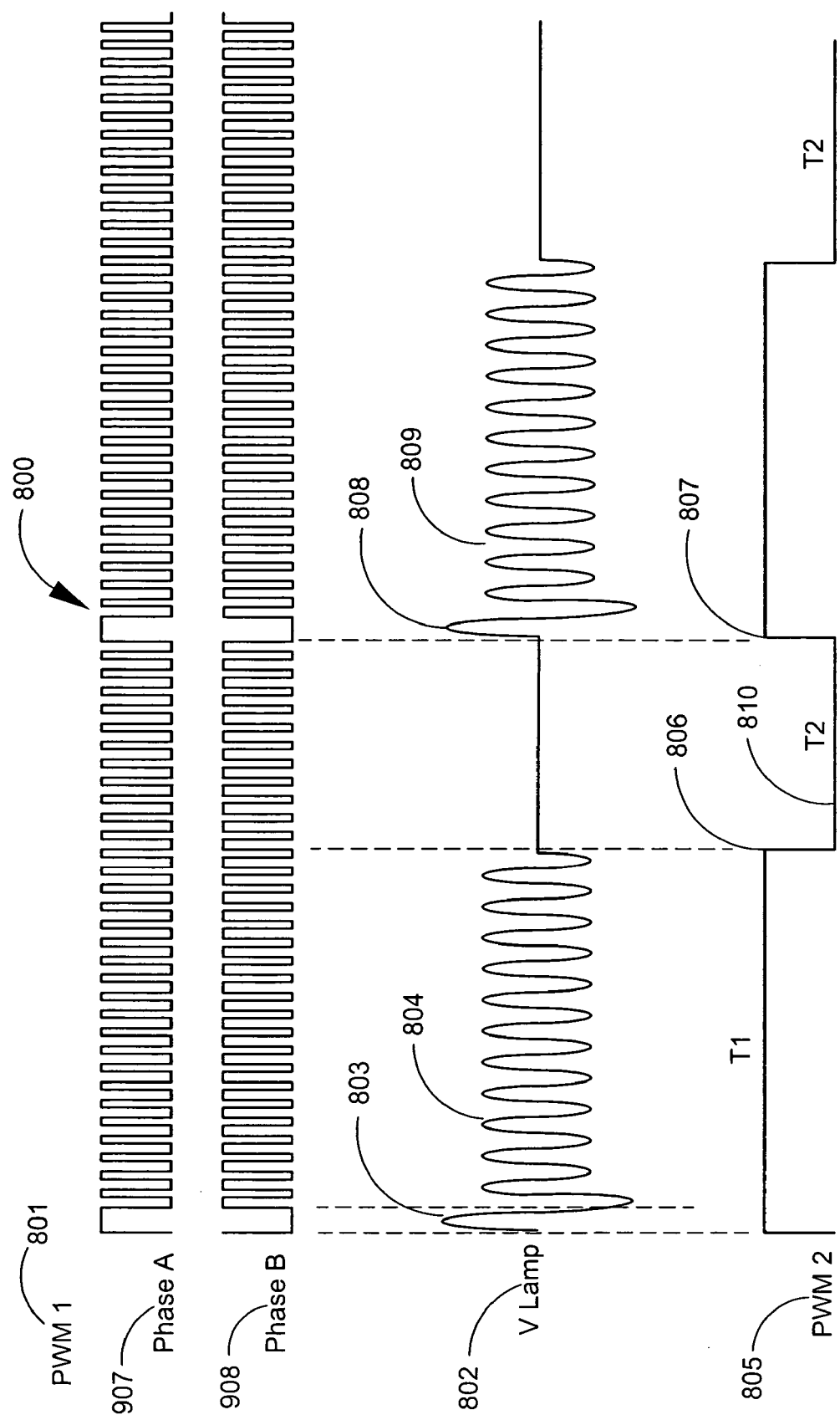
FIG. 8 shows a timing diagram of the digital controller and lamp voltage.

Attention is now turned to the operational characteristics of the digital controller 514. As mentioned above, conventional inverter circuits 106 such as that which is shown in FIG. 1 require timing pulses in order to operate. FIG. 8 illustrates PWM 1 signal 801, comprising Phase A signal 907 and Phase B signal 908, from a typical inverter controller 102 that activates the switching of Mosfet switches 122, which in turn switch currents into a transformer 112 and tuning capacitor 110. Once the currents are switched into the transformer 112 and tuning capacitor 110, a sinusoidal voltage is obtained on the primary side of the transformer 112. The transformer 112 converts the sinusoidal voltage in the primary side to a secondary voltage of a substantially larger value. Typical power conversion voltages for fluorescent lamps are 24 Volts RMS for the primary voltage and 2200 Volts RMS for the secondary.

Inverter circuits 106 in the prior art rely on analog circuits to produce the timing pulses needed for the inverter circuit 106 to operate. For example, ramp voltages in the inverter circuit 106 are generated using a capacitor external to the analog controller 102 (not shown). The controller 102 of FIG. 1 also contains an analog comparator, a voltage reference, a current source and other analog components (not shown). The capacitor and its value are fixed as part of the design and placed in a circuit board next to the analog controller. Other timing pulses are generated using similar techniques which rely on active analog components, capacitors and resistors.

As mentioned above, a significant drawback of these prior art analog methods of generating inverter circuit timing pulses is that the timing pulses have to be specifically designed to account for manufacturing variations in the transformers, Mosfets, capacitors, resistors and other inverter circuit components. This produces a design that will utilize timing pulses which will be significantly larger (and in some cases smaller) than what is needed to drive a particular set of fluorescent lamps. This results in an unnecessary higher amount of power driven into the lamps.

Furthermore, the precise point in time when the power Mosfets in an inverter circuit are switched has a significant influence in its power consumption. If a Mosfet is switched too early or too late, the Mosfet will operate in its linear region which will greatly increase power consumption. In addition, the precise timing of the switching action with respect to the current and voltage waveforms in the Mosfet is critical in order to achieve low power consumption. In analog designs such as that described above, the timing pulses are fixed and established based upon the worst case operating characteristics of the components. Consequently, the timing pulses will in general be mismatched to the precise needs of the system. This mismatch results in currents and voltages not occurring at the correct time and results in a higher amount of power consumption.

The digital control approach of the present invention overcomes the above issues by generating highly precise timing pulses for the inverter circuit. Since the timing pulses are synthesized with a high speed clock, they are precise, and do not suffer from errors due to component variations. Furthermore, since the timing pulses are generated with an adaptive synthesized timing circuit, the pulses can be calibrated to match the specific characteristics of the inverter components.

The timing pulses for an inverter circuit are shown in FIG. 8. A PWM 1 signal 801 of various duty cycles is produced by the Inverter Power PWM-1 Generator 905 of FIG. 9. Each pulse of the PWM 1 signal 801 produces a portion of a sinusoidal transformer secondary lamp voltage VLAMP 802. Depending on the duty cycle characteristic of the PWM 1 801, a voltage of various magnitudes will be produced for VLAMP 802. The larger the duty cycle of PWM 1 801, the larger the VLAMP 802 voltage will be. At point 803 on VLAMP 802, the lamp voltage is significantly larger in order to strike the fluorescent lamp, defined as the "strike voltage." Once the lamp strikes, the voltage can be reduced to a smaller voltage 804 on VLAMP 802, defined as the "sustaining voltage." The strike voltage for a fluorescent lamp used in a large screen Liquid Crystal Display (LCD) will typically be around 2200 Volts RMS. The sustaining voltage will typically be 1000 Volts RMS. The frequencies of the sinusoidal voltages for VLAMP 802 are on the order of 50 KHz.

Analog dimming of a fluorescent lamp will consist of varying by a slight amount the PWM-1 signal 801. This variation will change the voltage and the power on the secondary side of the inverter transformer 112, which will then result in a dimmer lamp 104. If too much analog dimming is used; the lamp will flicker and eventually turn off. For this reason, analog dimming is used in a relatively narrow range of lamp luminance control circuits. For substantial dimming of the lamp, digital dimming is preferred.

Figure 9:
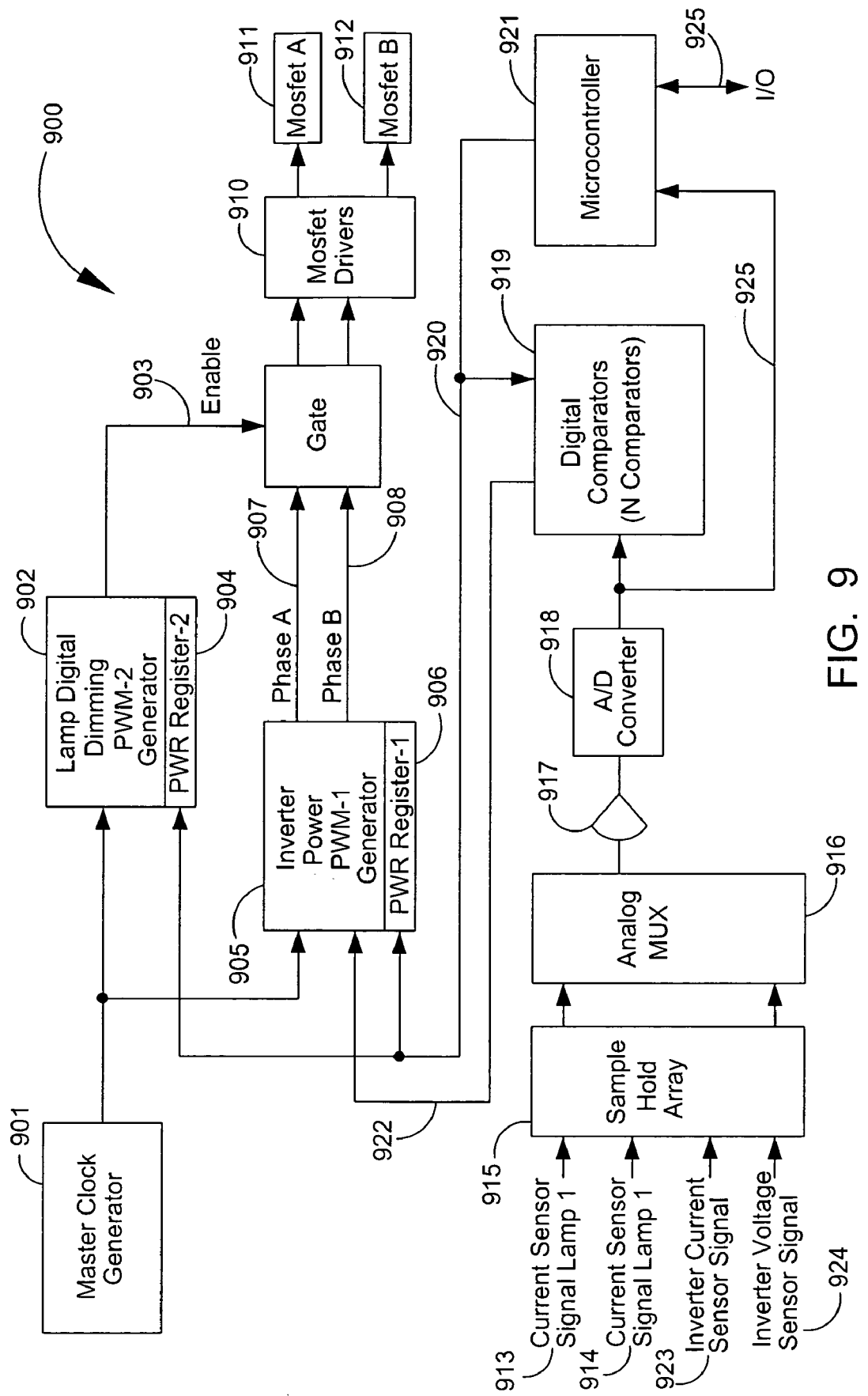
FIG. 9 shows a block diagram of the digital controller circuit of the present invention.

In the present invention, and referring to FIG. 9, a Lamp Digital Dimming PWM-2 Generator 902 is used. This circuit produces the waveform PWM-2 signal 805 (FIG. 8). During PWM-2 signal 805 period T1, the lamp is turned on. At the appropriate time 806, the lamp is completely turned off. The lamp remains off for a period of time T2. At time 807, the PWM-2 signal 805 will switch to a logic high signaling that the lamp must be turned on. At that particular time, PWM-1 signal 801 will change its duty cycle to produce a strike voltage 808. Once the digital controller detects that the lamp has turned on by using current sensor feedback information, PWM-1 801 will switch back to a duty cycle which will result in a sustaining voltage 809. PWM-2 signal 805 will typically have a repetition rate of 400 Hz or more. The order of magnitude of the repetition rate for PWM-2 signal 805 is such that the human eye cannot perceive the lamp being off. The duty cycle of PWM-2 signal 805 will determine the amount of luminance. Digital dimming is commonly used in backlight systems and allows for dimming percentages from 0% to 100%.

In FIG. 9, the system clock is synthesized with a Master Clock Generator 901, preferably running at 10 Mhz. The clock is used by two different Pulse Width Modulator (PWM) logic circuits. The first PWM circuit is the Inverter Power PWM-1 Generator 905 which produces a PWM signal used for generating high frequency pulses in the inverter circuit to switch the Mosfets 911, 912. The PWM register-1 906 contains a digital word which represents the duty cycle of the PWM-1 signal 801. The digital word is written into the register by Microcontroller 921.

In order to understand the concept of a PWM signal, consider PWM-2 signal 805 of FIG. 8. The PWM signal 801 is composed of periodic pulses which are made of a logic high period 809, lasting an amount of time T1 and a logic low period 810 lasting an amount of time T2. The duty cycle of the PWM signal 805 is defined as the ratio T1/(T1+T2). The duty cycle is usually expressed as a percent. For example, in a 60% duty cycle PWM signal, T1 will correspond to 60% of the time and T2 will correspond to 40% of the time. The repetition rate of the PWM signal 805 is the inverse of the total time or 1/(T1+T2).

The Inverter Power PWM-1 Generator 905 produces Phase A 907 and Phase B 908 signals. These signals are of opposite polarity and are used to drive each of the respective sides of the transformer (not shown). Inverter Power PWM-1 Generator 905 may also have its PWM signal duty cycle changed by the output of the Digital Comparators 919.

The second PWM circuit is the Lamp Digital Dimming PWM-2 Generator 902. This circuit generates a PWM signal having a duty cycle which corresponds to a digital word in the PWM Register-2. The digital word is written into the register by Microcontroller 921. The output of Lamp Digital Dimming PWM-2 Generator 902 is an Enable instruction 903 which is a signal that may completely turn off Phase A 907 and Phase B 908 with the use of logic in Gate 909. The outputs of Gate 909 connect to the Mosfet Drivers 910 which in turn drive Mosfet A 911 and Mosfet B 912. Mosfet A 911 is typically connected to one end of the inverter transformer and Mosfet B 912 to the other end of the transformer.

The sensor signals of the apparatus are used by the Microcontroller 921 to detect the Inverter Current Sensor Signal 923, the Inverter Voltage Sensor Signal 924, Current Sensor Signal for Lamp 1 913 and the corresponding signals for any other lamps in the backlight system. The Inverter Voltage Sensor Signal 924 and Current Sensor Signal for Lamp 1 913 are preferably located on the secondary side of the inverter transformer (not shown). The inputs can detect a number of current sensor signals up to Current Sensor Signal Lamp N 914, where N is determined by the number of lamps used in the system. Sensor signals for all lamps are captured simultaneously with the use of a Sample and Hold Array 915. The Analog Multiplexer 916 routes one of the signals form the Sample and Hold Array 915 to the Programmable Gain Amplifier 917 which amplifies the signal to the appropriate value depending on the size of the sensor signal. This is done to optimize the sensor signal in order to maximize the resolution of the detection by matching the signal amplitude to the input of the Analog to Digital Converter 918. The sensor information is routed on bus 925 to the Microcontroller 921 to determine the status of various portions of the system and to dynamically change the control of the inverter. The Digital Comparators 919 consists of hardware that compares the output of the Analog to Digital Converter 918 with a predetermined binary value loaded by the Microcontroller 921 which represents sensor current corresponding to lamps begin turned on. These binary values are stored as a result of initialization programming. Since the Digital Comparator 919 is implemented with combinational logic, the time delay as compared with the lamp luminance processes is negligible. There are N number of comparators each corresponding to a lamp.

The present invention applies digital drive synthesis to optimize the PWM signal used to control operation of the inverter circuit. The Microcontroller 921 contains in its internal memory default values for PWM-1 signal 801 and PWM-2 signal 805. Upon power up, the Microcontroller 921 will load the default PWM values into PWM Register-1 906 and PWM Register-2 904. PWM Register-1 906 determines the duty cycle of Inverter Power PWM-1 Generator 905, PWM Register-2 904 determines the duty cycle of Lamp Digital Dimming PWM-2 Generator 902.

During operation, the Microcontroller 921 detects the Inverter Current Sensor Signal 923, and the Inverter Voltage Sensor Signal 924. The sensor information is determined at a precise point in time since the Sample and Hold Array 915 can be triggered by the Microcontroller 921 and will hold the information until it is digitized. The point in time when the sensor signals are captured can be varied. This gives an accurate characterization of the inverter switching characteristics. This information is used to determine the switching characteristics of the inverter in order to ascertain the optimal point in time when the PWM-1 signal 801 should switch the Mosfets. As the switching characteristics are determined, the Microcontroller 921 will change the value of the PWM Register-1 906, which then modifies the duty cycle of the PWM-1 signal 801 in order to match the switching action to the turn on and off characteristics of the circuit. The modified timing will make the inverter operate with a high degree of efficiency by reducing power consumption. The process is a self calibrating operation. It is repeated continuously which will result in power efficiency given component and temperature variations as well as aging of the inverter circuit.

The present invention applies an adaptive strike process to modify the point in time when the transformer secondary voltage is changed from the strike voltage value 803 to the sustaining voltage value 804. Periodically, the system enters a routine where the currents in all lamps are sensed by Current Sensor Signal Lamp 1 913 and Current Sensor Signal Lamp N 914. Sensing is done at various points in time during the strike process by varying the precise time when the sensor signals are captured by the Sample and Hold Array 915. The sensor capture time is set by the Microcontroller 921. The sensor values from the output of the Analog to Digital Converter 918 are compared in the Digital Comparators 919 with predetermined binary values loaded by the Microcontroller 921 which represents sensor current corresponding to lamps begin turned on. The leading edge of the Inverter Power PWM-1 Generator 905 output is then adjusted to match the point in time when all the lamps are determined to carry current. In this manner, the lamps will only receive the strike voltage for the exact period of time. The point in time is continuously adapted with the high precision allowed by the Master Clock Generator 901. Since the Microcontroller 921 sets the process to continually calibrate the correct time for strike, the adjustment is not affected by either fixed or dynamic variations, such as those described in the background to this invention. The result is that the strike voltage 803 can be reduced to the sustaining voltage 804 at the optimal point in time thus reducing power consumption.

The disclosed control system using the disclosed control modules provides a CCFL control circuit that is highly optimized in cost and performance. All CCFLs in an array can be made to exhibit equal (or a specified) luminance and current while driven by the same inverter.

One skilled in the art will understand that the ordering of steps and components illustrated in the figures above is not limiting. The methods and components are readily amended by omission or re-ordering of the steps and components illustrated without departing from the scope of the disclosed embodiments.

Thus, a novel and improved method and apparatus for controlling luminent devices generally, and cold cathode fluorescent lamps in particular, have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of power control comprising:
  supplying a drive current to a multiple device array from a only one drive current source;

sensing a value of operating current from each device of the multiple device array; and reducing the operating current of each device in the multiple device array independently from variation in the operating current of every other device in the multiple device array in response to the sensed value of operating current by switching a combination of capacitors to reduce the drive current to conserve power consumption.

2. The method of claim 1 further comprising including an inverter as the drive current source and cold cathode fluorescent lamps as the multiple device array.

3. The method of claim 1 further comprising including a driver as the drive current source and light emitting diodes as the multiple device array.

4. An apparatus for power control comprising:
only one drive current source for supplying a drive current to a multiple device array;
sensors for sensing a value of operating current from each device of the multiple device array;
a microcontroller for receiving the sensed value of operating current and for generating a separate power conserving current control signal for each device of the multiple device array; and
a current control circuit for conserving power consumption by reducing the operating current of each device in the multiple device array independently from variation in the operating current of every other device in the multiple device array in response to the current control signal by switching a combination of capacitors to reduce the drive current.

5. The apparatus of claim 4 further comprising an inverter as the drive current source and cold cathode fluorescent lamps as the multiple device array.

6. The apparatus of claim 4 further comprising a driver as the drive current source and light emitting diodes as the multiple device array.

7. A method for power control comprising:
receiving a power conserving current control signal from a microcontroller;
generating a power conserving voltage control signal that is isolated from the power conserving current control signal;
filtering the power conserving voltage control signal to produce a filtered power conserving voltage control signal;
conserving power consumption by applying the filtered power conserving voltage control signal to a transistor to limit a power efficient alternating current in response to the power conserving current control signal; and
conducting both polarities of the power efficient alternating current from a diode bridge through the transistor to a device.

8. The method of claim 7 further comprising operating the transistor in linear mode.

9. The method of claim 7 further comprising operating the transistor in switched mode.

10. The method of claim 7 further comprising including cold cathode fluorescent lamps as the multiple device array.

11. A circuit for power control comprising:
an isolator for receiving a power conserving current control signal from a microcontroller and for generating an isolated a power conserving voltage control signal from the power conserving current control signal;

a filter for filtering the power conserving voltage control signal to produce a filtered power conserving voltage control signal;
a transistor for limiting a power efficient alternating current in response to the filtered power conserving voltage control signal; and
a diode bridge for conducting both polarities of the power efficient alternating current through the transistor to a device.

12. The circuit of claim 11 further comprising an optical isolator as the isolator.

13. The circuit of claim 11 further comprising a photovoltaic converter as the isolator to convert the current control signal to a proportional light output and to convert the proportional light output to the power conserving voltage control signal.

14. A method for power control comprising:
supplying a drive current to a multiple device array from a single power source;
sensing a value of operating current from each device in the multiple device array;
generating a separate power conserving current control signal from the sensed value of operating current for each device in the multiple device array; and
applying the power conserving current control signal to a plurality of switches coupled to each device in the multiple device array to reduce a power efficient operating current of each device in the multiple device array independently from variation in the operating current of every other device in the multiple device array in response to the power conserving current control signal by reducing the drive current to conserve power consumption.

15. The method of claim 14 further comprising including a cold cathode fluorescent lamp as each device in the multiple device array.

16. The method of claim 14 further comprising including a light emitting diode as each device in the multiple device array.

17. A circuit for power control comprising:
a single power source for supplying a drive current to a multiple device array;
sensors for sensing a value of operating current from each device in the multiple device array;
a microcontroller for receiving the sensed value of operating current and for generating a separate power conserving current control signal from the sensed value of operating current for each device in the multiple device array; and
switches coupled to each device in the multiple device array for reducing a power efficient operating current of each device in the multiple device array independently from variation in the operating current of every other device in the multiple device array in response to the power conserving current control signal by reducing the drive current.

18. The circuit of claim 17 further comprising a cold cathode fluorescent lamp as each device in the multiple device array.

19. The circuit of claim 17 further comprising a light emitting diode as each device in the multiple device array.

20. The circuit of claim 17 further comprising a backlight of a liquid crystal display as the multiple device array.

21. The circuit of claim 17 further comprising a software module executed by the microcontroller for maintaining a predetermined luminance set point for each device in the multiple device array.

22. The circuit of claim 17 further comprising a software module executed by the microcontroller for varying light output of a selected portion of the multiple device array to create visual effects.

23. The circuit of claim 17 further comprising a software module executed by the microcontroller for supporting a graphical user interface to perform initial current settings and to override servo control algorithm maintenance settings.

24. A method of power control for multiple devices comprising:
- generating a high frequency pulse width modulated power control signal with a high frequency clock;
- generating a low frequency pulse width modulated power control signal with a low frequency clock;
- sensing output feedback information for each of the multiple devices in a multiple device array;
- using the feedback information to determine optimal pulse width timing modification values for the high and low frequency pulse width modulated power control signals by applying a digital power conservation algorithm executed by a microcontroller;
- modifying the pulse widths of the high and low frequency power control signals according to the determined modification values to produce optimized high and low frequency pulse width modulated power control signals; and,
- routing the optimized high and low frequency pulse width modulated power control signals to an inverter switching circuit for driving each of the multiple devices.

25. The method of claim 24 wherein the digital power conservation algorithm is continuously executed.

26. An apparatus for power control of multiple devices comprising:
- a high frequency clock for generating a high frequency pulse width modulated power control signal;
- a low frequency clock for generating a low frequency pulse width modulated power control signal;
- sensors for sensing output feedback information for each device in a multiple device array;
- a microcontroller for executing a digital power conservation algorithm using the feedback information to determine optimal pulse width timing modification values for the high and low frequency pulse width modulated power control signals;
- pulse width modulator generators for modifying the pulse widths of the high and low frequency power control signals according to the determined modification values to produce optimized high and low frequency pulse width modulated power control signals; and,
- logic gates for routing the optimized high and low frequency pulse width modulated power control signals to an inverter switching circuit for driving each device.

* * * * *

UNITED STATES PATENT AND TRADEMARK OFFICE
CERTIFICATE OF CORRECTION

| | |
|---|---|
| PATENT NO. | : 7,151,346 B2 |
| APPLICATION NO. | : 10/984614 |
| DATED | : December 19, 2006 |
| INVENTOR(S) | : Jorge Sanchez |

It is certified that error appears in the above-identified patent and that said Letters Patent is hereby corrected as shown below:

On the Title Page:

In the Related U.S. Application Data, remove

"Provisional application No. 60/518,592, filed on Nov. 6, 2003."

and replace with

--This application is a utility conversion of U.S. Provisional application serial number 60/518,592, filed Nov. 6, 2003. This application is also a continuation in part of co-pending PCT application number PCT/US2004/003400, having an international filing date of Feb. 6, 2004, which in turn is a utility conversion of U.S. Provisional application serial number 60/445,914, with a filing date of Feb. 6, 2003.--

In the specification of the patent:

Column 1, in the heading remove "CROSS-REFERENCE TO RELATED APPLICATION"

and replace with --CROSS REFERENCE TO RELATED APPLICATIONS-- in the CROSS-REFERENCE TO RELATED APPLICATION data, remove

"This application is a utility conversion of U.S. Provisional Application No. 60/518,592, filed Nov. 6, 2003, which is a continuation in part of co-pending PCT Application No. PCT/US2004/003400, having an international filing date of Feb. 6, 2004, which is a conversion of U.S. Provisional Application No. 60/445,914 with a filing date of Feb. 6, 2003."

UNITED STATES PATENT AND TRADEMARK OFFICE
CERTIFICATE OF CORRECTION

PATENT NO. : 7,151,346 B2  Page 2 of 2
APPLICATION NO. : 10/984614
DATED : December 19, 2006
INVENTOR(S) : Jorge Sanchez It is certified that error appears in the above-identified patent and that said Letters Patent is hereby corrected as shown below:

and replace with

--This application is a utility conversion of U.S. Provisional application serial number 60/518,592, filed Nov. 6, 2003. This application is also a continuation in part of co-pending PCT application number PCT/US2004/003400, having an international filing date of Feb. 6, 2004, which in turn is a utility conversion of U.S. Provisional application serial number 60/445,914, with a filing date of Feb. 6, 2003.--

Signed and Sealed this

Fourteenth Day of October, 2008

JON W. DUDAS
*Director of the United States Patent and Trademark Office*